2,621,374

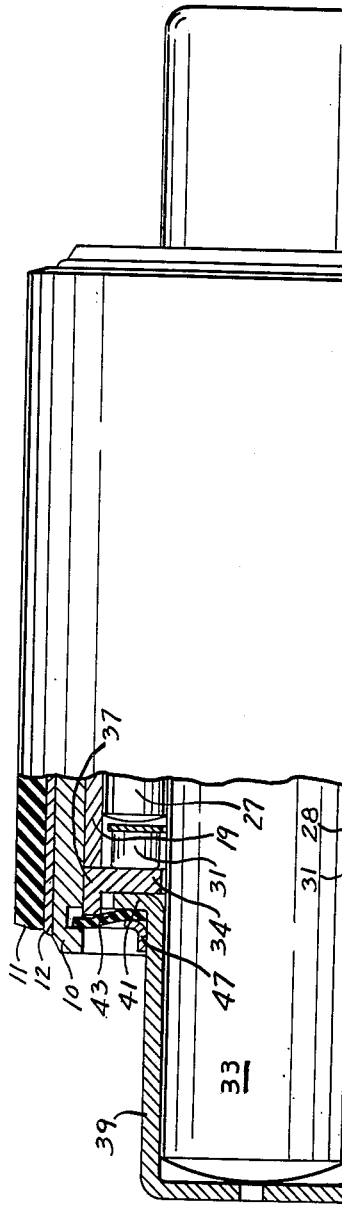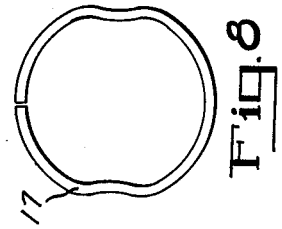
INVENTOR.
EDWIN P. WAITE
BY Jennings & Carter
ATTORNEYS Dec. 16, 1952    E. P. WAITE    2,621,374
TOP ROLL FOR FIBER ATTENUATING APPARATUS
Filed Oct. 11, 1950    2 SHEETS—SHEET 2
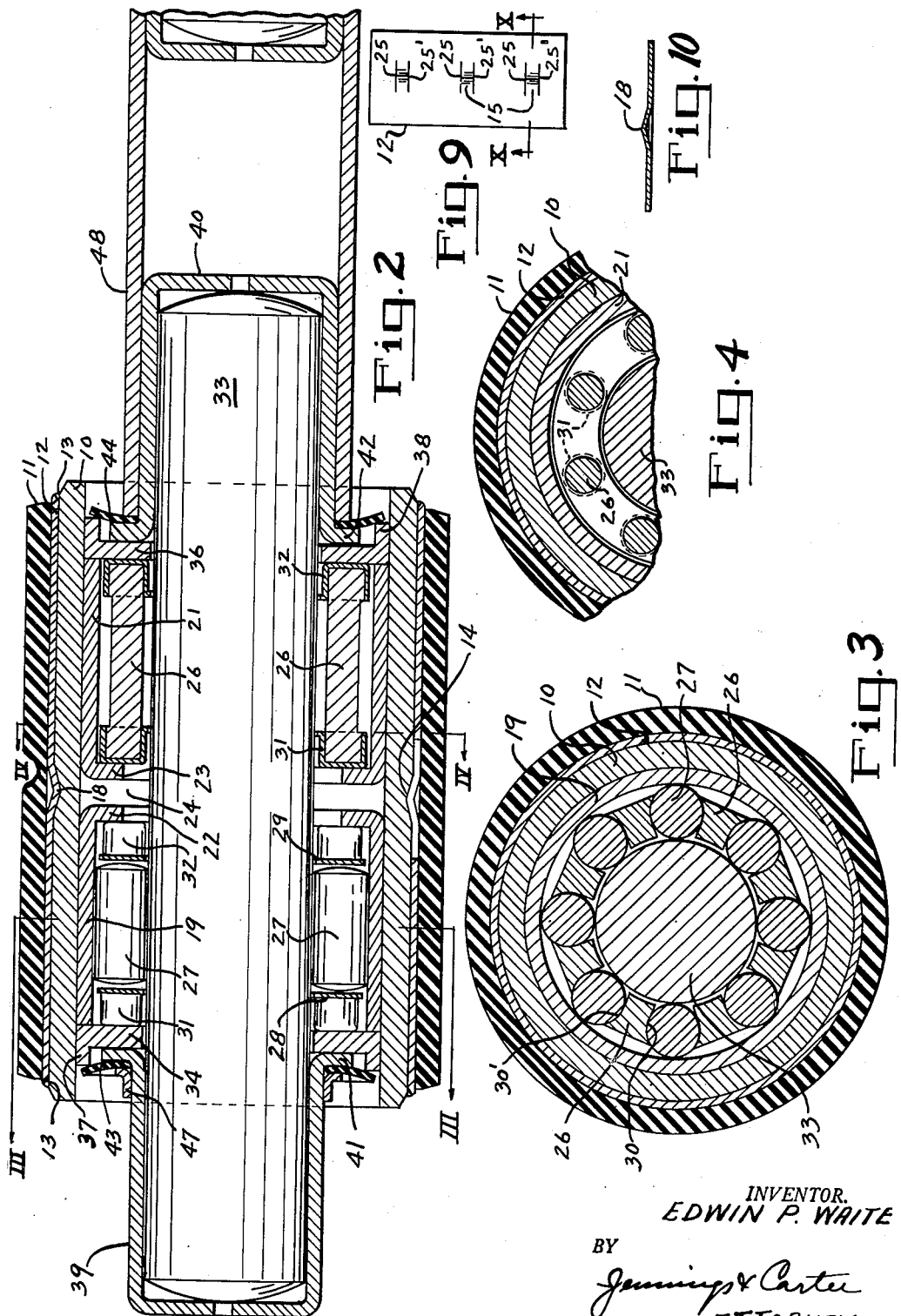
INVENTOR.
EDWIN P. WAITE
BY
Jennings & Carter
ATTORNEYS Patented Dec. 16, 1952

UNITED STATES PATENT OFFICE 2,621,374

TOP ROLL FOR FIBER ATTENUATING APPARATUS

Edwin P. Waite, Columbus, Ga., assignor to Precision Rolls, Inc., Columbus, Ga., a corporation of Georgia Application October 11, 1950, Serial No. 189,575

7 Claims. (Cl. 19—142)

This invention relates to a top roll for fiber attenuating apparatus such as drawing frames, roving frames, slubbers, and the like and has for its principal object the provision of an anti friction roll assembly having roller bearings thus providing a maximum bearing surface and affording a longer life at slow speeds and maximum pressures.

Another object of the invention is to provide a top roll of the character designated which shall have a permanent seal for the unit thus preventing any foreign matter from entering the assembly and one which, when assembled, can be packed with a lubricant and run for an indefinite period of time without further lubrication.

A further object of the invention is to provide a top roll of the character designated in which the outer jacket or fiber engaging sleeve or cot may be easily removed therefrom and another cot put in place thus materially reducing the time that the assembly is out of operation for repairs, such for instance, as for regrinding or rebuffing of the jacket as has been the practice heretofore.

A still further object is to provide a top roll assembly of the character designated each roll of which having individual spindles, thus making it possible to assemble two or more units between any prescribed center to center distance.

My invention is further characterized by its simplicity of design and ease of manufacture and by the ease with which it may be assembled and mounted on the fiber attenuating apparatus.

In the design of top roll assemblies, I have found it to be of the greatest importance that such assemblies meet all speed and load requirements within the ranges normally existing on the several types of drawing apparatus. Roller bearings have a maximum bearing surface far in excess of ball bearings and afford a longer life at slow speeds and high pressures than do ball bearings. This is due to the fact that the rollers afford more unit area support than do the balls of a ball bearing and in so doing have a life expectancy directly proportional to the respective areas involved.

Top rolls embodying features of my invention are illustrated in the accompanying drawing forming a part of this application in which:

Fig. 1 is an elevational view of a top roll made in accordance with my invention, partly broken away and in section;

Fig. 2 is a longitudinal sectional view showing a slightly modified form of the invention together with its connection to an adjacent roll;

Fig. 3 is a sectional view taken along the line III—III of Fig. 2;

Fig. 4 is a fragmentary sectional view taken along the line IV—IV of Fig. 2;

Fig. 5 is a sectional view of a portion of similarly constructed barrels having serrated surfaces;

Figs. 6 and 7 are sectional views of a portion of the barrel and cot showing alternate means for bonding the two together;

Fig. 8 is an elevational view of the circular spring which serves as a lock between the bushing for the cot and the barrel shown in Fig. 1;

Fig. 9 is a developed view looking at the inside of the sleeve showing the means for securing the sleeve to the barrel shown in Fig. 2;

Fig. 10 is a sectional view taken along line X—X of Fig. 9; and

Fig. 11 is a sectional view of a top roll showing a needle bearing structure.

Referring now to the drawings for a better understanding of my invention, I show a cylindrical barrel 10 which may serve to contact the fibers directly by providing a serrated surface on similarly constructed barrels as shown at 20b in Fig. 5 or by providing a knurled surface on the barrel to contact a suitable surface on another roll as is well known in the art. The barrel may also have mounted thereon a jacket 11 formed of a suitable material such as rubber, leather, a molded composition, or a combination of leather and felt strips glued into shape. The length of the barrel 10 is primarily determined by the size of the contact surface of the drive roll upon which the complete assembly works and it is not necessarily limited to the size of the jacket 11. However, the jacket 11 should never be longer than the barrel 10.

The jacket 11 may be secured directly to the barrel 10, where the maximum outside diameter of the roll must be limited, or it may be assembled with a shell 12 between the barrel and the jacket. The jacket 11 may be permanently mounted on the barrel by securing it with a suitable adhesive as shown at 20 in Fig. 7. Also, the surface of the barrel may be knurled as shown at 20a in Fig. 6.

The shell 12 is made of thin metal to fit snugly over the barrel 10. The ends are chamfered as at 13 to assure accurate centering for grinding. To lock the shell 12 to the barrel 10, I provide a circular, V-shaped groove 14 in the outer surface of the barrel, which is preferably located midway between the ends. A bead 16 is rolled into the shell 12 opposite the groove 14 as shown in Fig. 1. A circular spring 17, made of a resilient material such as spring steel wire, fits between the groove 14 and the bead thus serving as a lock between the shell 12 and the barrel 10. The spring 17 is not constructed in a true circle, but at approximately one quarter of its length from each of the abutting ends it assumes an elliptical shape, as shown in Fig. 8. This shape provides flexibility and permits the ring to expand when passing over the barrel and to contract to engage the V-shaped groove 14.

In Figs. 2, 9 and 10 I show a slightly modified form of lock which may be provided between the shell 12 and the barrel 10. The shell 12 may be slitted longitudinally and equally spaced angularily about the shell as shown at 25 and 25′, so that two or more strips of metal 15 are formed in the shell 12 free at both sides for their entire lengths and are indented midway between the ends of the shell, as at 18, to form inwardly extending V-shaped protuberances midway between the ends of the shell. The V-shaped protuberances snap into the groove 14, when mounting the shell 12 on the barrel 10 thus forming a lock between the barrel and the shell as shown in Fig. 2.

Within the barrel 10 are pressed a pair of annular roller bearing races 19 and 21 having annular inturned flanges 22 and 23, respectively, at the inner ends thereof. The flanges 22 and 23 give added strength to the races 19 and 21 and are spaced axially from each other so as to provide a space 24 for receiving a lubricant when the roll is assembled. Mounted within each of the races 19 and 21 are a plurality of separators 26, and mounted between the separators are a plurality of rollers 27. The separators comprise small metal rods, round at each end with hollowed out cylindrical surfaces 30 and 30′ intermediate their ends so that when assembled between the cylindrically arranged group of rollers 27 they hold the rollers equal distances apart. The separators 26 are preferably formed from a suitable wear resisting material such as bronze.

Also mounted within the races 19 and 21 are retainer discs 28 and 29 having inwardly facing, equally spaced cups 31 and 32 formed integrally therewith for receiving the round ends of the separators 26. The retainers permit the ends of the rollers 27 to rotate thereagainst and prevent endwise motion of the rollers. The round ends of the separators 26 may be pressed into the cups 31 and 32 or secured thereto by soldering or other suitable means.

It will be obvious that the rollers may be employed between the retainers without separators in between the same as described above, by placing additional rollers 27′ within the races 19 and 21 to take up the voids, in other words, a needle bearing structure may be employed as shown in Fig. 11.

Passing through the barrel 10 and contacting the roller bearings 27 is a spindle 33. It will be noted that the spindle 33 does not contact the inturned flanges 22 and 23 of the bearing races nor the separators 26. This construction provides a free passage for the lubricant to feed to the roller bearings 27.

Pressed into the barrel 10 at the opposite ends thereof and fitting against the races 19 and 21 are annular thrust plates 34 and 36 which hold the bearing assemblies in place. The thrust plates 34 and 36 are provided with outwardly extending annular flanges 37 and 38 at the outer edges thereof thus forming a shallow cup like member which fits over the spindle 33. The bore of the thrust plates is made only a few thousandths of an inch greater than the outside diameter of the spindle 33, providing a practically complete mechanical seal with the spindle.

Mounted over the ends of the spindle 33 with a press fit are cup shaped sleeves 39 and 40. Each of the sleeves at its inner end is provided with an outturned flange as shown at 41 and 42. The flanges 41 and 42 bear against the thrust plates 34 and 36, respectively, substantially sealing the assembly against the ingress of foreign matter and preventing the egress of lubricant. Also, the cup-like construction prevents to a great extent slipping or misalignment of the internal parts when the unit is subjected to a hard blow at either end. The sleeves are preferably formed from a low carbon steel and case hardened to provide a good bearing surface against the thrust plates 34 and 36.

Surrounding the sleeves 39 and 40 and bearing against the flanges 41 and 42 are sealing members 43 and 44, respectively which may be formed from a suitable flexible material such as rubber or metal. The outer portions of the sealing members bear against the thrust plates 34 and 36 with sufficient pressure to form a circumferential contact therewith thus further preventing the entry of dirt into and exit of lubricant from the unit. Also, as shown in Fig. 1, the barrel 10 may be internally grooved, as at 46, to receive the flexible seal and exert pressure upon it in opposition to that applied by the thrust plates.

The sealing member 43 is held in place by means of a retaining ring 47 pressed over the sleeve 39 and bearing against the seal, while the sealing member 44 is held in place by means of a connecting sleeve 48 which is in the form of a hollow shaft pressed over the sleeve 40 to make up an assembly of two or more units. It will be apparent that this construction provides means for utilizing two or more single units mounted between centers spaced various distances apart. The connecting sleeve may also carry the usual weights customarily applied to the roll assembly and can be so designed to take loads in excess of normal.

From the foregoing, it will be seen that I have devised a top roll assembly for fiber attenuating apparatus which shall have a much longer life at low speeds and which is capable of withstanding the high pressures encountered in such apparatus. By completely sealing the unit, foreign matter is prevented from entering the assembly and the lubricant is retained, thus assuring that the unit performs under normal conditions indefinitely without any service other than the regrinding or rebuffing of the jackets.

While I have shown my invention in several forms, it will be obvious to those skilled in the art that it is not so limited but is susceptible of various other changes and modifications without departing from the spirit thereof, and I desire, therefore, that only such limitations shall be placed thereupon as are specifically set forth in the appended claims.

What I claim is:

1. In a top roll for fiber attenuating apparatus including a cylindrical barrel having a spindle therethrough, an annular bearing race pressed in each end of said barrel, an inturned annular flange at the inner end of each race, there being a space defined between said inturned flanges for receiving lubricant, and a space defined between said flanges and the spindle for feeding the lubricant to the rollers, an annular thrust plate pressed in each end of the barrel contacting the outer ends of the bearing races and fitting about the spindle with a close running fit, roller bearings between the thrust plates and said inturned flanges on the bearing races, separators between the rollers, and means at the ends of the races holding the separators in place.

2. A top roll for fiber attenuating apparatus as defined in claim 1 in which the means holding the separators in place comprises a pair of discs having equally spaced cups formed therein in which the ends of the separators fit.

3. In a top roll for fiber attenuating apparatus including a cylindrical barrel having a spindle extending therethrough, an annular bearing race pressed in each end of the barrel, an inturned annular flange at the inner end of each of said races, an annular thrust plate at each end of said barrel contacting the outer ends of said bearing races and disposed about the spindle with a close running fit, outturned axially extending annular flanges at the outer edge of said thrust plates, cup shaped sleeve members having radially extending flanges at the open end thereof fitting over the ends of the spindle and bearing against the thrust plates, a flexible annular sealing member bearing against the flanges of the sleeve members and contacting the outturned axially extending flanges of the thrust plates, and roller bearings between the thrust plates and said inturned flanges on the bearing races.

4. A top roll for fiber attenuating apparatus as defined in claim 3 in which the flexible sealing members are held in place by means of an annular retaining ring fitting over the cup shaped sleeve member and bearing against the flexible sealing member at one end of the assembly and a connecting sleeve fitting over the sleeve member and bearing against the flexible sealing member at the opposite end of the assembly.

5. A top roll for fiber attenuating apparatus as defined in claim 4 in which there are a plurality of top roll assemblies joined by means of said connecting sleeve.

6. In a top roll for fiber attenuating apparatus including a cylindrical barrel having a spindle extending therethrough, an annular bearing race pressed in each end of the barrel, an inturned annular flange at the inner end of each of said races, an annular thrust plate at each end of said barrel bearing against the outer ends of said bearing races and disposed about the spindle with a close running fit, cup shaped sleeve members having outturned flanges at the open ends thereof fitting over the ends of the spindle and bearing against the thrust plates, a flexible annular sealing member bearing against the flanges of the sleeve members, grooves in the barrel at a predetermined position from the ends thereof receiving the outer portion of the flexible sealing member and exerting pressure thereupon in opposition to that applied by the thrust plates, and roller bearings between the thrust plates and said inturned flanges on the bearing races.

7. In a top roll for fiber attenuating apparatus including a cylindrical barrel having a spindle extending therethrough, an annular bearing race pressed in each end of the barrel, an inturned annular flange at the inner end of each of said races, an annular thrust plate at each end of said barrel contacting the outer ends of the bearing races and disposed about the spindle with a close running fit, needle bearings between the thrust plates and said inturned flanges on the bearing races, cup shaped sleeve members having outturned flanges at the open end thereof fitting over the ends of the spindle and bearing against the thrust plates, a flexible annular sealing member bearing against the flanges of the sleeve members and the outer portion of the thrust plates, and means to hold the sealing member in place.

EDWIN P. WAITE.

REFERENCES CITED

The following references are of record in the file of this patent:

UNITED STATES PATENTS

| Number | Name | Date |
| --- | --- | --- |
| 1,300,590 | Donald | Apr. 15, 1919 |
| 1,583,276 | Brown et al. | May 4, 1926 |
| 2,352,167 | Campbell | June 27, 1944 |
| 2,355,511 | Cobb | Aug. 8, 1944 |
| 2,387,703 | Jones | Oct. 23, 1945 |
| 2,412,357 | Robinson | Dec. 10, 1946 |

FOREIGN PATENTS

| Number | Country | Date |
| --- | --- | --- |
| 870,115 | France | Dec. 5, 1941 |